M. E. OSWALT.
REVERSE LEVER UPRIGHT BRAKE.
APPLICATION FILED SEPT. 4, 1908.
907,394.
Patented Dec. 22, 1908.
2 SHEETS—SHEET 1.
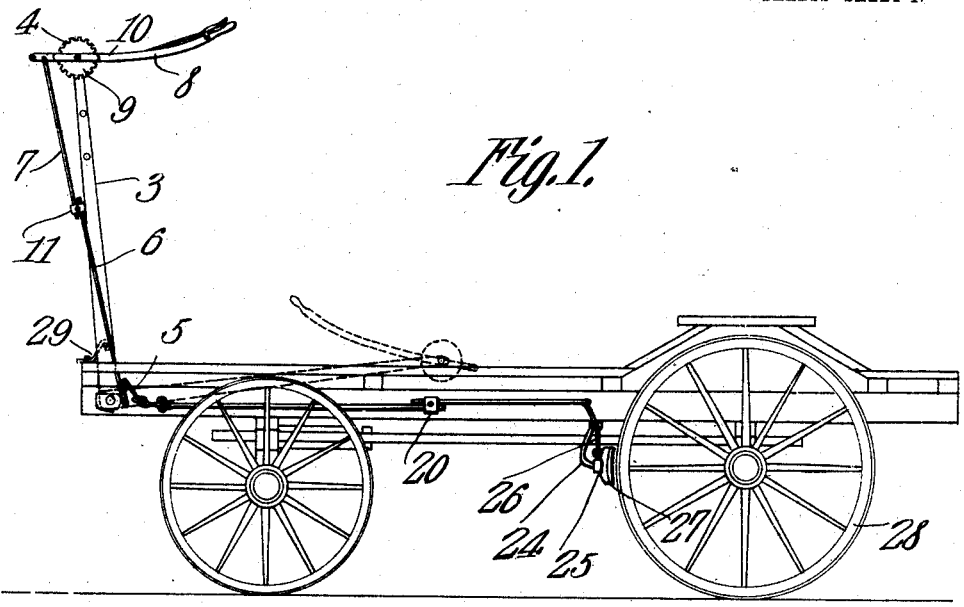
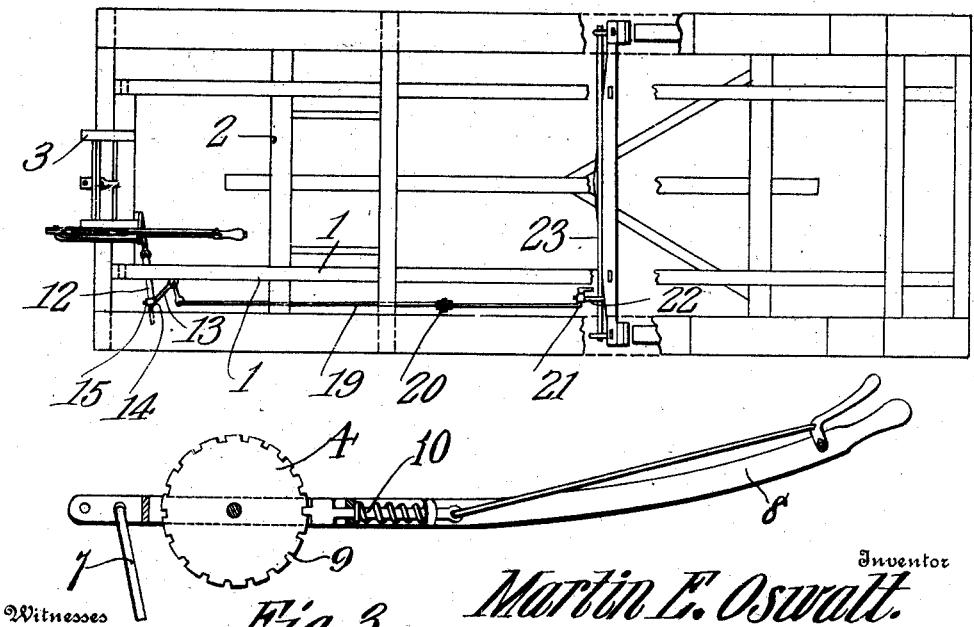

M. E. OSWALT.
REVERSE LEVER UPRIGHT BRAKE.
APPLICATION FILED SEPT. 4, 1908.

907,394.

Patented Dec. 22, 1908.
2 SHEETS—SHEET 2.

Witnesses

Inventor
Martin E. Oswalt.
By C. A. Snow & Co.
Attorneys

UNITED STATES PATENT OFFICE.

MARTIN E. OSWALT, OF MANSFIELD, OHIO.

REVERSE-LEVER UPRIGHT BRAKE.

No. 907,394.　　　　　Specification of Letters Patent.　　　Patented Dec. 22, 1908.

Application filed September 4, 1908. Serial No. 451,713.

*To all whom it may concern:*

Be it known that I, MARTIN E. OSWALT, a citizen of the United States, residing at Mansfield, in the county of Richland and State of Ohio, have invented a new and useful Reverse-Lever Upright Brake, of which the following is a specification.

This invention has relation to brake mechanism for wagons or trucks, hay racks, or platforms, and it consists in the novel construction and arrangement of its parts, as hereinafter shown and described.

The object of the invention is to provide a mechanism as indicated, which is especially adapted to be used upon hay racks or platforms for wagon or truck running gears. The parts of the brake mechanism are so assembled that the operating lever connected with the mechanism may be manipulated when the rack or platform is either loaded or unloaded. And, with this object in view, the mechanism consists, primarily, of a series of rockers and rods operatively connected together and which communicate with the brake beam and also with an operating lever which is mounted upon the upright of the hay rack or platform.

Various means of adjustment for the several parts are provided, as will be hereinafter explained.

Figure 4:
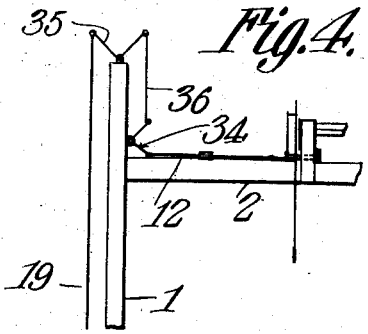
Figure 5:
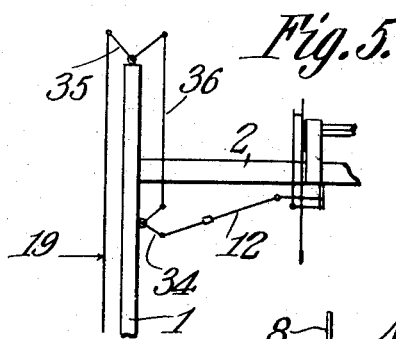
Figure 6:
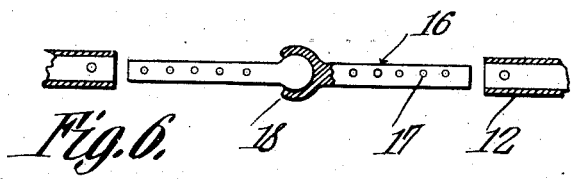
Figure 7:
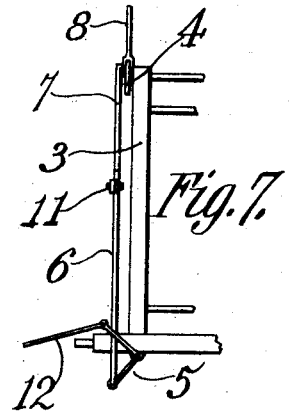
Figure 8:
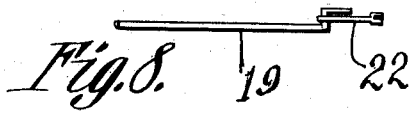
Figures 9, 10:
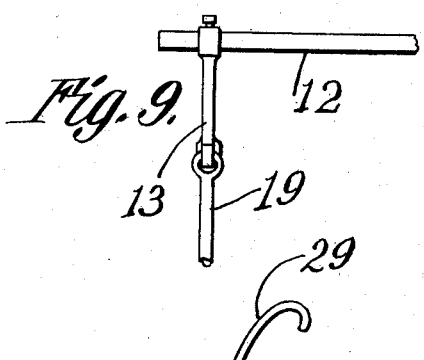
Figure 11:
Figure 12:
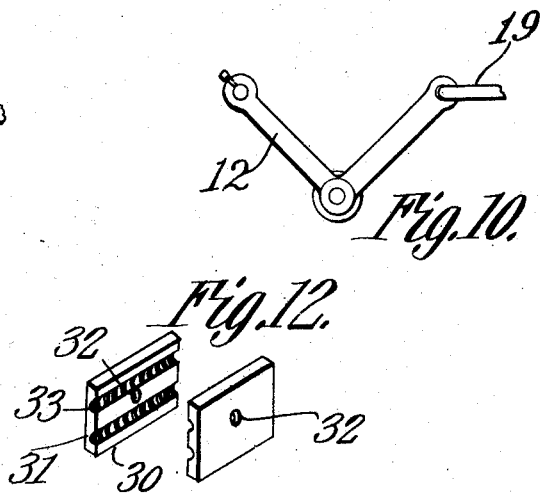

In the accompanying drawings:—Figure 1 is a side elevation of a hay rack mounted upon the running gear of a wagon and having the brake mechanism applied thereto. Fig. 2 is a top plan view of the hay rack, with parts broken away, showing the brake mechanism attached thereto. Fig. 3 is a side elevation of an operating lever used in the brake mechanism. Figs. 4 and 5 are diagrammatic views, showing the modified forms of the arrangement of the several parts of the brake mechanism. Fig. 6 is a plan view of a universal joint used in the brake mechanism. Fig. 7 is an edge elevation of that part of the brake mechanism which is mounted upon the upright of the hay rack or platform. Fig. 8 is a detail view, showing the manner in which the operating rods are connected with the rocker arms of the brake mechanism. Fig. 9 is another detail view of a means for adjustably connecting the rods of the brake mechanism with the rocker arms thereof. Fig. 10 is a detail view of still another modified form for connecting the operating rods and the rocker arms. Fig. 11 is a perspective view of a hook which may be used for the purpose of holding the upright of the rack or platform in an upright position. Fig. 12 is a perspective view of separated clamp members which are used for the purpose of providing an adjustable means for connecting the end portions of the rod sections together.

The rack or platform upon which the brake mechanism is used consists of the usual side sills 1, which are mounted upon the transversely disposed bolsters 2. The upright 3 is pivotally mounted between the forward end portions of the sills 1, and is adapted to be swung from an upright position down into an approximately horizontal position with relation to the body of the rack or platform. The disk 4 is fixed at the upper end portion of the upright 3, and may be located at the side thereof, or at the front or rear of the same, as desired. The rocker arm 5 is pivotally mounted at the lower end of the upright 3 at the front or rear side of the bolt 2. The lower section 6 of a connecting rod or means is pivotally attached at its lower end with one arm of the rocker 5, while the section 7 of the said connecting rod is pivotally connected with the working end of the lever 8, which in turn is fulcrumed at the upper end of the upright 3. The disk 4 is provided upon its periphery or inner face with the teeth 9, and the lever 8 is provided with a pawl mechanism 10, which is adapted to engage the said teeth 9, whereby the said lever 8 is held in a fixed position with relation to the disk 4. The inner end portions of the rod sections 6 and 7 are adjustably connected with each other by means of a clamp 11. The detail structure of the said clamp will be explained hereinafter.

The other end of the rocker arm 5 is connected by means of a rod 12, with a rocker arm 13, which is fulcrumed or pivoted upon the outer side of one of the side sills 1 of the wagon or truck rack or platform. The said arm 12 passes transverely through that sill 1 to which the rocker 13 is attached. One end of the rocker 13 is provided with a sleeve 14, which in turn is provided with a set screw 15. The said sleeve 14 receives the outer end portion of the rod 12, and the said rod may be adjustably secured in the said sleeve by means of the set screw 15. The rod 12 is also preferably made in sections which are substantially tubular, and which at their inner ends, receive the outer end portions of the universal joint members 16. A detail view of the said members is given in Fig. 6 of the drawing. Each of the members of the universal joint 16 is provided with a series of perforations 17, and bolts are adapted to pass transversely through the said perforations 17 and perforations provided at the inner ends of the sections of the connecting rod 12. Thus means is provided for longitudinally extending the said rod 12. The universal joints may be of any approved pattern, but are preferably of the ball and socket type.

One end of the sectional rod 19 is pivotally connected with that arm of the rocker 13 other than the arm thereof to which the rod 12 is connected. The inner end portions of the sections of the rod 19 are adjustably connected together by a clamp 20, which is similar in its construction to the clamp 11 hereinbefore referred to. The end of the rod 19 opposite that end which is connected with the rocker 13 is provided with an L shaped extremity 21, pivotally connected with the arm 22, mounted upon the shaft 23. The arms 24 depend from the shaft 23 and connect at their lower ends with the brake beam 25, which is suspended by means of the links 26 below the rack. The brake shoes 27 are mounted upon the beam 25, and are adapted to engage the rear wheel 28 of the wagon or truck running-gear. The hook 29 is mounted upon the forward end portion of the rack, and is adapted to engage back of and at lower end of upright 3, and when in such engagement with the said upright, the said hook will hold the upright in a substantially vertical position as illustrated in the heavy lines in Fig. 1 of the drawings. The clamps 11 and 20 are made up of the members 30, as shown in Fig. 12, and each member is provided upon its inner face with the longitudinally disposed channels 31, which are adapted to receive the end portions of the rod sections which are connected together by the said clamp members. The clamp members 30 are held together by means of a bolt which passes transversely through the perforations 32, provided in the said members. The channels 31 are provided with the ridges or teeth 33, which afford friction surfaces for effectually engaging the rod sections and preventing the same from slipping when the brake is applied.

The operation of the form of the brake mechanism as above described, is as follows:—When the upright 3 is in the upright position as illustrated in the heavy lines in Figs. 1 and 2 of the drawings, and the wagon or truck rack or platform is loaded, an operator on top of the load may grasp the lever 18 and swing the same, whereby the rod sections 6 and 7 are caused to move longitudinally, which, in turn, will swing the rocker 5. Through the rod 12 the rocker 13 will be swung, which, in turn, will move the rod 19 longitudinally. The said rod 19 will swing the arm 22, which will turn the shaft 23 and cause the depending arm 24 to move the brake beam 25 laterally, which in turn will force the brake shoes 27 in contact with the peripheries of the wheels 28 of the running gear of the wagon or truck. Thus the brake is applied, and, to remove the brake from the wheels, the operation above described is reversed. When the wagon or truck rack or platform is unloaded the hook 29 may be disengaged from back of upright 3, and the said upright may be swung down into the dotted position, as illustrated in Fig. 1 of the drawings, and when in such position, the lever 8 may be reversed into the position as indicated in the dotted lines. By reason of the fact that the rod 12 is provided with a universal joint 18, the said upright 3 may be readily swung down as indicated, and it is obvious that when the upright is in the reclining position shown and described, that the lever 8 may be swung, as above described, when the brake will be applied in the same manner as when the upright 3 is in its upright position.

The mechanism herein shown and described is applied to a hay rack or platform, but it is obvious that the same mechanism may be applied to wagons or railway baggage and express trucks, and that, in lieu of the brake shoes 27 and the connecting beams, the brake proper may be in the form of a friction or band brake attached to or near the hubs of the wheels 28.

In the modified forms of the brake operating mechanism, as illustrated in diagrammatic views, Figs. 4 and 5, the connecting rod 12 does not pass through the side sill, but is connected at its outer end with a rocker 34, pivotally mounted upon the inner side of the side sill 1. The rocker 35 is pivotally mounted at the forward end of the sill 1, and the rod 36 connects one arm of the rocker 35 with that arm of the rocker 34 opposite to the arm thereof with which the rod 12 connects. The forward end of the rod 19 connects with that arm of the rocker 35 opposite to that with which the rod 36 connects. The arrangements of the parts shown in the said Figs. 4 and 5 are substantially alike, with the exception that the rocker 34, as shown in Fig. 5, is located behind the bolster 2, whereas in the form as shown in Fig. 4, the rocker 34 is located in front of the bolster 2. In both instances the parts operate alike and in a similar manner to that described for the form of the invention as shown in Figs. 1 and 2. The advantage gained by the arrangement as shown in Figs. 4 and 5 is that it is not necessary to pass the connecting rod 12 through the side sill 1, and, consequently, the said sill is not weakened by slots or perforations.

Having described my invention, what I claim as new, and desire to secure, by Letters Patent, is:—

1. In combination with a wagon frame having an upright pivotally mounted thereon, a brake-operating mechanism comprising a disk fixed at the upper end portion of the upright, and being provided with teeth, a lever fulcrumed to the upright and having a pawl adapted to engage the teeth of the disk, a rod pivotally connected at one end with the working end of the lever, a rocker pivotally mounted at the lower end of the upright, said rocker having one of its arms connected with said rod, a rocker located at the side of the wagon frame, a rod pivotally connecting the last said rocker with the first said rocker and having at an intermediate point a universal joint, a brake proper carried by the wagon frame, and a rod connecting the said brake with the last said rocker.

2. In combination with a wagon frame and an upright pivotally mounted thereon, a disk fixed at the upper end portion of the upright, a lever fulcrumed to the upright or disk, and carrying means for engaging the disk, a rocker arm pivotally attached at the lower portion of the upright, a longitudinally extensible rod, connecting one arm of the rocker with the working end of the lever, a rocker pivotally mounted upon the wagon frame, a longitudinally extensible rod having a universal joint operatively connecting the said rockers together, a brake mechanism mounted upon the wagon frame, and a longitudinally extensible rod operatively connecting said brake mechanism with the last said rocker arm.

3. In combination with a wagon frame and an upright pivotally mounted thereon, a brake mechanism comprising a disk fixed to the upper end portion of the upright, a lever fulcrumed to the upright or disk and having means for engaging the said disk, a rocker arm pivotally mounted at the lower end portion of the upright, a longitudinally extensible rod connecting said rocker arm with the working end of the lever, a rocker arm pivotally mounted upon the wagon frame, a rod connecting said rocker arms together and having a universal joint, a brake mechanism mounted upon the wagon frame and a rod operatively connecting said brake mechanism with the last said rocker arm.

4. In combination with a wagon-frame and an upright pivotally mounted thereon a brake-operating mechanism comprising a disk fixed to the upper end portion of the upright, a lever fulcrumed to the upright or disk and having means for engaging said disk, a rocker arm pivotally mounted at the lower end portion of the upright, a rod operatively connecting said rocker arm with the working end of the lever, a rocker arm pivotally mounted upon the wagon-frame, a longitudinally extensible rod connecting said rocker arms together and having a universal joint, a brake carried by the wagon frame and a rod operatively connecting said brake with the last said rocker arm.

In testimony that I claim the foregoing as my own, I have hereto affixed my signature in the presence of two witnesses.

MARTIN E. OSWALT.

Witnesses:
J. B. KAUTZE,
E. G. CARL.